US010076208B2

(12) United States Patent
Castellani et al.

(10) Patent No.: US 10,076,208 B2
(45) Date of Patent: Sep. 18, 2018

(54) SYSTEM FOR THE PRODUCTION OF BEVERAGES (71) Applicant: KONINKLIJKE PHILIPS N.V., Eindhoven (NL)

(72) Inventors: Andrea Castellani, Milan (IT); Federico De Angelis, Gaggio Montano (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 383 days.

(21) Appl. No.: 14/346,746

(22) PCT Filed: Sep. 27, 2012

(86) PCT No.: PCT/IB2012/055158
§ 371 (c)(1),
(2) Date: Mar. 24, 2014

(87) PCT Pub. No.: WO2013/046149
PCT Pub. Date: Apr. 4, 2013

(65) Prior Publication Data
US 2014/0224130 A1    Aug. 14, 2014

(30) Foreign Application Priority Data
Sep. 30, 2011 (EP) .................................... 11183402

(51) Int. Cl.
A47J 31/06    (2006.01)
A47J 31/40    (2006.01)
A47J 31/44    (2006.01)
B65D 85/804    (2006.01)

(52) U.S. Cl.
CPC ......... A47J 31/407 (2013.01); A47J 31/4492 (2013.01); B65D 85/8046 (2013.01)

(58) Field of Classification Search
CPC ........ A47J 31/36; A47J 31/40; A47J 31/3623; A47J 31/368; A47J 31/4492
(Continued)

(56) References Cited

U.S. PATENT DOCUMENTS 6,698,333 B2    3/2004 Halliday et al.
7,210,401 B1 *    5/2007 Rolfes ................... A47J 31/368
                                                99/289 R
(Continued)

FOREIGN PATENT DOCUMENTS

CN    101877983 A    11/2010
DE    102006004329 A1    8/2007
(Continued)

Primary Examiner — Dana Ross
Assistant Examiner — Ayub Maye (57) ABSTRACT

A system for production of beverages includes a beverage dispenser and a pod to be inserted in the beverage dispenser for passage of an extraction liquid of the beverage. The pod includes a filtering body which defines a space that contains a food substance from which the beverage is obtained. The filtering body has on the outside a flange. Further, the system includes a recognition element associated to the filtering body which can be recognized and/or interpreted by a recognition device of the beverage dispenser. The recognition device is electrical and includes an electrical circuit. The recognition element includes a bridge configured to create an electrical contact between two sections of the electrical circuit.

14 Claims, 3 Drawing Sheets (58) Field of Classification Search
USPC .......... 219/289, 295; 99/279, 280, 281, 282, 99/283, 285, 295
See application file for complete search history.

(56) References Cited

U.S. PATENT DOCUMENTS

| | | | |
|---|---|---|---|
| 7,578,230 B2 * | 8/2009 | Rahn ..................... | A47J 31/36 99/281 |
| 7,640,845 B2 * | 1/2010 | Woodnorth ............. | A47J 31/54 99/280 |
| 8,459,179 B2 * | 6/2013 | Ozanne ................ | A47J 31/407 426/232 |
| 8,919,240 B2 * | 12/2014 | Ozanne ............... | A47J 31/3685 99/280 |
| 9,198,533 B2 | 12/2015 | Ozanne | |
| 2002/0048621 A1 * | 4/2002 | Boyd ................. | A47J 31/3623 426/77 |

FOREIGN PATENT DOCUMENTS

| | | | | |
|---|---|---|---|---|
| EP | 0451980 | A2 | 10/1991 | |
| EP | 2345351 | A1 | 7/2011 | |
| FR | 2912124 | A1 | 8/2008 | |
| JP | 11143023 | A | 5/1999 | |
| JP | 2009008574 | A | 1/2009 | |
| WO | 0228241 | A1 | 4/2002 | |
| WO | WO 2007087890 | A1 * | 8/2007 | .......... A47J 31/3623 |
| WO | 2009084061 | A1 | 7/2009 | |
| WO | 2011000725 | A1 | 1/2011 | |
| WO | 2011076748 | A1 | 6/2011 | |

* cited by examiner

SYSTEM FOR THE PRODUCTION OF BEVERAGES

CROSS-REFERENCE TO PRIOR APPLICATIONS

This application is the U.S. National Phase application under 35 U.S.C. § 371 of International Application No. PCT/IB2012/055158, filed on Sep. 27, 2012, which claims the benefit European Patent Application No. 11183402.4, filed on Sep. 30, 2011. These applications are hereby incorporated by reference herein.

FIELD OF THE INVENTION

This invention concerns the sector of machines for the preparation of beverages through extraction from food substances (such as for example coffee) contained in single-serve units to be inserted in the said machines. More specifically, the object of this invention is a system for the production of beverages through extraction from pods containing food substances. The object of this invention is also a pod that is usable in the said system and a beverage dispenser usable in the said system. The term "dispenser" means any type of equipment for the production of beverages from pods, whether of the "household" or the "vending" type.

BACKGROUND OF THE INVENTION

For some time now, the market has seen an increase in the popularity of beverage machines or dispensers which use single-serve units that need to be inserted in the corresponding sections of the machines which contain the substance from which the beverage is obtained via extraction through the passage of water under pressure.

The single-serve units currently in use are basically of two types. One type of unit is generally called a "capsule" and is basically a unit with rigid walls containing the food substance and that has two bases through which the extraction water passes. The capsules are placed into chambers defined by two bodies, one shaped to receive most of the capsule and a closing body which tightly seals the chamber. The water is introduced into the chamber by traversing the capsule. Thanks to the rigid shape of the capsule, the hydraulic seals of the chamber allow the water to basically traverse the capsule without recirculating the extracted substance through the chamber.

A second type of unit, of a flat shape, is generally called a "pod" and consists of two sections made of thin soft material, pierced, paired in order to define a cavity in which the food substance is placed. The material may be for example paper, or a cloth or a non-woven fabric with filtering properties. The two sections are generally circular and are coupled along their outer edges, defining an outer annular flange. The machines which use pods have two half-shells which are sealed to define a chamber where the pod is placed. Specifically, the annular flange of the pod is squeezed, for sealing, between the opposite surfaces of the half-shells, defined outside the chamber. Due to the pod's soft consistency, the water introduced into the chamber and the resulting beverage basically also reach the walls of the chamber; moreover, the seal obtained in the area of the flange is insufficient and the water and the extracted substance tend to reach the outer limits of the sealing area (that is, the area occupied by the flange) due to the liquid absorption capacity of the material of which the pod is made.

The factors which influence the final quality of the beverage produced with this kind of equipment and units include, among other, the quality of the food substance from which the beverage is extracted, the quantity of substance inside the unit, the quality of the water extracting the beverage, the quantity and the temperature of this water, as well as the pressure and speed with which the water passes through the unit. These factors are linked to each other and the final result depends on how they combine with each other.

The machines currently on the market make it possible to control some of these parameters, such as for example the quantity of beverage to be obtained (for example, a large coffee or a strong coffee), or the water temperature, but are not able to control the parameters depending on the type of substance contained. For example, considering a single-serve unit with a substance for a cold beverage, the user of the machine must already know which command to use in order to obtain cold water to extract the beverage. The machine is not able to tell which type of unit is being used. Another typical example is the case of a single-serve coffee unit for "strong coffee." The user will have to press the button for "strong coffee" (and will therefore need to know well the machine in order to operate the desired selection). It goes without saying that there are many different options that may occur and hence it would be necessary to provide the user with many different commands, which would make the machine particularly complicated and difficult to use. Instead, machine producers have opted to manufacture machines which are easy to use.

Another problem typical of single-serve beverage units to be used in this type of dispensers is due to the use of units in machines which are not suitable for them. This problem occurs particularly for pods and less for capsules. In fact, the rigid walls of the capsules make it difficult to introduce a capsule which is not suitable for the said machine, as even small size differences would prevent the infusion chamber from closing. The situation is different in the case of pods, as their soft consistency makes it possible to place into the chamber pods with sizes slightly different from those of the pods intended for use with the respective machine; the introduction of a pod which is not suitable for that machine, even if the infusion chambers seems to close, usually leads to bad sealing of the chamber, with resulting loss (in some cases abundantly so) of water or beverage through the seals and soiling the area around the machine.

Another problem linked to the shape of the units is due to the now growing market of "false units," that is units which are peddled as originals, but which a careful external examination show to instead be counterfeits, with the obvious damage that results for coffee producers. This problem is particularly important in the case of pods, given their low production price.

SUMMARY OF THE INVENTION

The task of the present invention is to mitigate the problems outlined above and linked to single-serve beverage units in the shape of pods. The invention is defined by the independent claims. The dependent claims define advantageous embodiments.

In the context of this task, an important objective of this invention is to create a system for the production of beverages which includes a beverage dispenser and a pod to be inserted into the beverage dispenser for the passage of the extraction liquid of the beverage; the pod, as it is known, includes a filtering body which defines internally a space containing the food substance from which the beverage is obtained (such as for example coffee), and externally has a flange. Characteristically, the pod includes at least one recognition element associated to the filtering body which can be recognized and/or interpreted by a recognition device of the beverage dispenser.

This establishes an association between the type of pod and the adjustable parameters of the dispenser, in order to obtain the right beverage based on the type of substance contained and also on the user's preferences. The dispenser is programmed to properly manage information for recognizing the pod. For example, the recognition element on the pod may concern the type of substance contained, the quantity of substance, any processing parameters, the age of the pod, a production or delivery code, etc. Based on the recognized parameter, the dispenser, possibly in combination with commands selected by the user, sets the correct process parameters, such as for example the temperature of the water, the quantity of water to be used, the pressure and/or the speed of the water supply, the infusion time, etc. It must be noted that the information linked to the recognition element on the pod may also concern other aspects, which are not linked to the preparation of the beverage, such as for example statistics. For example, the dispenser may memorize the number of different types of pods used, or other data which may be useful for managing machine maintenance, or orders for new pods based on actual consumption, etc.

In a preferred embodiment, the recognition element (or the recognition elements) is placed on the flange. Such advantageous position makes it possible to place at least one recognition element in an area in which a certain flatness is ensured and hence an easier communication with the recognition device.

Unlike the previous case, in line with an especially preferred embodiment, at least one recognition element is placed on a flap departing from the flange.

The direction of this flap is opposite to the center of the pod, that is the flap recedes from the area occupied by the food substance contained inside the pod.

The direction of such a flap can be coplanar to the flange (when the flange is arranged on a plane, made of soft material, that is not rigid). In one advantageous example, such flap is made in one piece with the flange, for example obtained from the same sheet of soft material which forms the lower and/or upper part of the pod's filtering body. In other embodiments, such flap can be made continuing the flange and be impregnated or covered with non-absorbent material (or with very low capacity to absorb liquids). According to other embodiments, such flap can be made from a different material than the flange and fastened to it or to another part of the filtering body.

Additionally, in other embodiments, the recognition element can be placed on a soft support that is applied to the pods or, more specifically, the flap.

Conveniently, the flap can be useful also for handling the pod during the extraction from the infusion chamber, once it is opened. In fact, it is possible to grab the flap with the fingers without touching the rest of the pod, which becomes "beverage" soup. The flap, being the part of the pod which is the farthest from the area crossed by the water, remains the part which absorbs the least water.

This aspect, i.e. the characteristic of remaining the "driest" as compared to the rest of the pod, means that placing at least one recognition element on it is particularly advantageous with respect to other positions. In fact, the recognition element will tend to not become soiled with the beverage produced, as the latter will not be absorbed by the flap that contains it and hence the recognition devices of the dispenser which recognize this element will not become dirty, devices which are generally placed in an area close to the area occupied by the flap (as will become more clear further below) and which can therefore become dirty if the flap becomes dirty.

In addition, placing the recognition element on the flap corresponding to a certain mark in the outer closing area of the infusion chamber selects a unique position of the recognition element with respect to the recognition device, thus avoiding problems with incorrect placement of the pod by the user in relation to the possibility of recognition.

According to a particularly advantageous embodiment, the recognition device has optical recognition and at least one recognition element is optically recognizable. Such optical recognition device is preferably capable to recognize and/or interpret shape, size, depth, thickness, color or a combination of these characteristics. For example, the recognition element (or elements) represents a color (for example the flange or the flap are of a certain color) and the optical elements of the recognition device, such as for example a small video camera or a photocell or similar, are able to identify the type of color and communicate the information to the electronic elements inside the dispenser which process it for example in order to plan the type of action to be executed, for example the selection of certain parameters of the machine (temperature of the water to be released, quantity of water to be released, etc.) or even simply to memorize information.

Similarly, the optical elements may be able to recognize or detect a certain shape. For example, the recognition element can be a regular geometrical shape such as for example a circle, a triangle or a square, etc. Obviously, the optical elements may even be capable of recognizing the color of a certain shape, hence, a recognition element consisting of a certain shape of a certain color can represent double information. Conveniently, more colors and more shapes can be present at the same time.

The shapes can include designs, symbols and characters in general, hence also texts of one or more alphanumerical characters.

The shapes may also include various types of codes, such as for example standardized codes like bar codes, matrix codes (or QR codes) or other types of codes.

The recognition element that is optically recognizable (with the use of a small video camera, a video sensor or a photocell, etc.) can consist of a variation in thickness on the flange or, even better, on the flap, such as for example a protuberance, or a dip, a carving, a perforation, a groove, a section of the edge of the flange or of the flap which is shaped in a special way.

The shape of the flap also represents a possible implementation of the recognition element. For example, the flap may be triangular, rectangular, partially curved, etc., and the recognition element recognizes that shape of the flap.

It can be predicted that the recognition element will be a combination of shapes, colors and thickness variations, etc.

According to other embodiments, the recognition element of the system according to the invention is mechanical. In this case, the recognition element on the pod will preferably have at least one variation in thickness with respect to the part of the filtering body on which it appears, and this variation can be detected mechanically, for example via a mechanical probe fitted into the recognition device.

Also, in line with other embodiments, the recognition device has magnetic recognition and at least one recognition element is a magnet or is recognizable magnetically. For example, the recognition element changes the magnetic field in which it is immersed and this variation can be detected by the recognition device. Another example is the use of recognition with radio frequencies of the RFID type or similar (for example, a transponder or RFID label can be placed on the flange or preferably on the flap and the recognition device has a RFID reader).

According to other preferred embodiments, the recognition device is electrical and includes at least one electrical circuit and the recognition element includes a bridge capable of creating an electric contact (or to insulate electrically) two sections of the said electrical circuit.

It must be noted that all the recognition systems mentioned above, with the exception of the mechanical ones, are very sensitive to the presence of liquids (and in particular liquids soiled with food substances), which may obstruct or mask the "sensors" used (optical sensors, magnetic detectors, electrical bridges, etc.).

According to other preferred embodiments, the recognition device may include a combination of two or more optical, mechanical, magnetic, or electric recognition devices mentioned above, just like the recognition element may include a combination of two or more of the elements that are optically, mechanically, magnetically or electrically recognizable presented above.

The object of the invention also includes a pod for beverage dispensers, the pod comprising a filtering body with defines a space containing the food substance from which the beverage is obtained and which presents externally a flange; such pod also includes at least one recognition element placed on the filtering body, recognizable and/or interpretable by a recognition device in a system according to one or more of the embodiments presented above.

Similarly, the object of the invention is also a beverage dispenser for use with pods containing the food substances from which the beverages are obtained with extraction liquid; such dispenser includes a recognition device for recognition elements associated to the pods in a system according to one or more of the embodiments presented above.

From another point of view, the object of the invention is a pod for beverage dispensers, including a filtering body which defines a space containing the food substance from which the beverage is obtained and which presents externally a flange; such pod also includes at least one recognition element placed on the filtering body, recognizable and/or interpretable by a recognition device.

According to a preferred embodiment of this pod, at least one recognition element is placed on the flange.

Conveniently, according to another preferred embodiment of the pod, the recognition element is placed on a flap departing from the flange.

According to another preferred embodiment of the pod, the recognition element is placed on a support fastened to the flap.

With reference to the pod, at least one recognition element is optically recognizable and its or their recognition characteristics include one or several of the following: shape (possibly also in the shape of texts and/or codes and/or symbols), size, depth, thickness, color.

According to another embodiment, at least one recognition element is recognizable mechanically, for example such recognition element consist of a variation in thickness with respect to the part of the filtering body on which it is fitted, while the variation in thickness is detected mechanically.

According to another embodiment, the recognition element is recognizable magnetically and includes for example a transponder or RFID label.

According to another embodiment, the recognition element includes an electrical circuit, or a section of an electrical circuit or even a bridge capable of creating an electric contact (or even to insulate electrically) two sections of a recognition electrical circuit.

These and other aspects of the invention will be apparent from and elucidated with reference to the embodiment(s) described hereinafter.

BRIEF DESCRIPTION OF THE DRAWINGS

Other characteristics and advantages of the invention follow from the description of some of its preferred but not exclusive embodiments, illustrated as an example only in the drawings annexed, where.

DETAILED DESCRIPTION OF CERTAIN EMBODIMENTS OF THE INVENTION

With reference to the figures mentioned above, a pod to be used in a system according to this invention is indicated with 10. This pod includes a filtering body 11, consisting of two sections 11A of filtering sheets of a circular shape and united in order to define an internal space 12 which contains the food substance from which the beverage is obtained, in this case preferably coffee powder. The union of the two sheets 11A defines an annular flange 13 which is also soft but which also shows a planar extension for the case in which it rests on a common plane.

The pod is preferably manufactured by known methods. For example, the union along the annular flange may take place via gluing or heat sealing or another technique which does not create contamination problems for the food substance contained inside the pod. The union area is indicated in the figures with number 12A.

The material of the filtering body 11 is preferably also a material generally used for producing pods, and may include paper, cloth, non-woven fabric, a film, etc., which is perforated, micro-pierced, or processed so as to allow in at least one of its sections the passage of the water and of the beverage.

In this embodiment, the pod 10 has a flap 14 which departs from the annular flange 13 away from the internal space 12 of the pod containing the coffee powder. Preferably, the flap 14 is coplanar with the annular flange. In this example, the flap takes on a radial direction with respect to the central axis of the pod.

Conveniently, in the described embodiment, the flap 14 consists of two equal semi-flaps made of one piece with the sections of sheets 11A of the filtering body and united to the rest of the annular flange. In other embodiments, the flap can be made of one piece with one sheet 11A and hence its thickness will be basically equal to half of the thickness of the annular flange 13. In yet other embodiments, the flap can be made as a continuation of the flange and impregnated or covered with non-absorbent material (or with low liquid absorption capacity). And in other embodiments, the flap could be made of a different material than that of the flange, for example a polymeric material with no or very low liquid absorption capacity, united with the flange for example through gluing or heat sealing or stamping.

According to the invention, the pod 10 includes a recognition element 15 associated to the filtering body 11 and recognizable and/or interpretable by a recognition device, described in more detail below, fitted in the beverage dispenser in which the pod is to be placed. The term "dispenser" means any type of equipment for the production of beverages from pods, whether of the "household" (such as for example domestic coffee machines) or the "vending" type.

In the described preferred embodiment, the recognition element 15 is placed on the flap 14 (practically, the recognition element 15 is, in the specific example, integrated with the filtering body 11). In other embodiments, the recognition element can be placed on or in the annular flange.

In yet other embodiments, the recognition element can be placed on a support, such as for example a thin film, to be applied to the flap, for example through gluing (but other adhesion techniques are also possible).

The presence of the recognition element on the pod and of the corresponding recognition device in the dispenser makes it possible, for example, to associate the type of pod and the adjustable parameters of the dispenser in order to obtain the right beverage based on the type of substance contained and also on the basis of user preferences, or to fulfil other functions, as described in more detail below.

Figure 2:
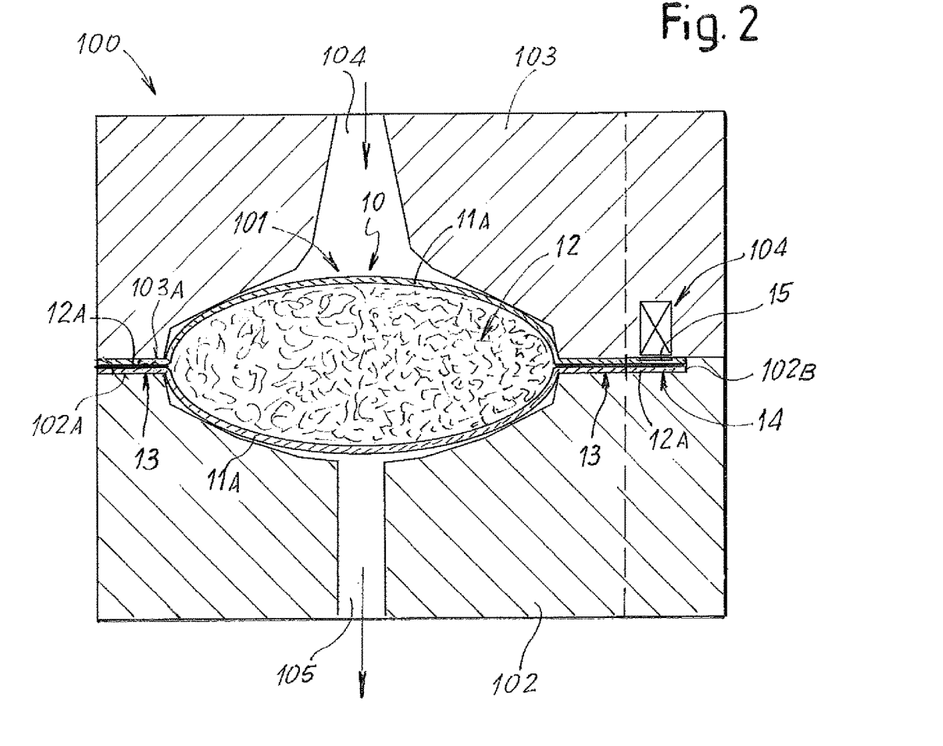
FIG. 2 represents a schematic sectional overview of a beverage dispenser containing a pod for the implementation of a system of beverage production according to this invention.

The beverage dispenser using a pod is generally indicated with the number 100. A section of it, representing the support of the pod which defines the infusion chamber 101 where the pod is placed, is shown in FIG. 2. The various functional and mechanical sections of the dispenser which are not useful for the presentation of the invention are not described below, as they are generally known in advance.

For what regards the sections of the dispenser which interact with the pod, FIG. 2 shows a lower support 102 which has a concave section able to accommodate the pod 10, with one of the pod's convex parts placed in the said concave section. FIG. 2 also shows an upper closing body 103 of the infusion room 101, which has an opposite concave section which corresponds to the concave section of the lower support 102, defining chamber 101. The upper closing body 103 consists of an inlet pipe 104 into the chamber 101 for the water under pressure originating from the dispenser tank, not shown. Similarly, the lower support 102 consists of an outlet pipe 105 for the chamber, which carries the beverage extracted from the pod towards a distribution zone, not shown in the figures. The chamber and the pipes are represented schematically, for the sole purpose of illustrating which are the functional elements that interact with the pod.

The pod 10 is placed with one of its convex parts in the concave section of the lower support 102, with the resulting annular flange 13 supported by the lower surface 102A (preferably flat) for the closing of chamber 101. The closing body moves relative to the support of the upper surface 103A (preferably flat) for the closing of chamber 101 so as to overlap with the lower surface 102A, therefore, squeezing the flange into a sandwich shape and creating a hydraulic seal around the chamber (other sealing means may also be applied).

The structure described hitherto is basically the typical structure of an infusion chamber for pods.

In the preferred embodiment under discussion here, the annular flange 13 is completely compressed, squeezed, between the lower and upper surfaces 102A and 103A for the closing of the chamber.

The flap 14, in this embodiment, is resting on a lower support 102B, which in this example is to the side of the lower support 102 and continues the surface of the lower support surface 102A. When chamber 101 is closed, the abovementioned recognition device 15 of the pod is placed in correspondence with the flap 14, generally indicated with 104. In this example, this device 104 is integrated on the upper closing body 103, but in other embodiments it can be separated from it.

In addition, in certain embodiments, the lower support 102B for the flap may accommodate an imprint (not shown in the Figs.) shaped according to the flap itself, which ensures the positioning of the pod (and hence of the flap) in the correct position in the chamber, so that there is a correspondence between the position of the recognition device and the position of the recognition element on the pod.

In FIG. 2, the recognition device 104 is indicated in a generic manner. FIGS. 3 to 6 show certain more specific examples of embodiments.

Figure 1:
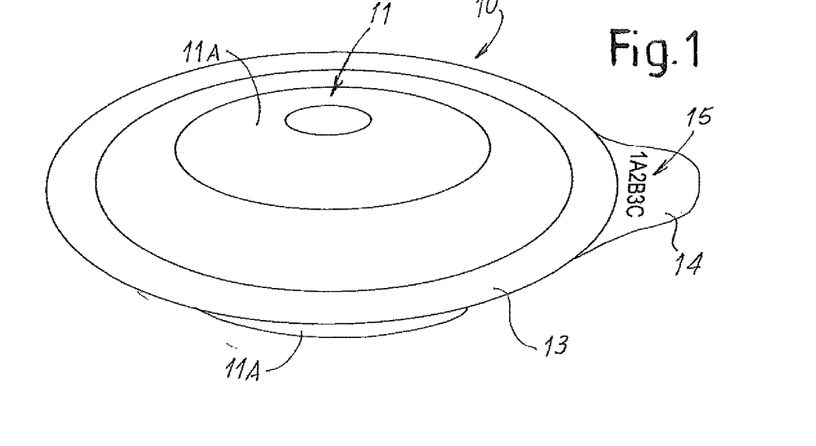
FIG. 1 represents a pod to be used in a system according to this invention.
Figure 3:
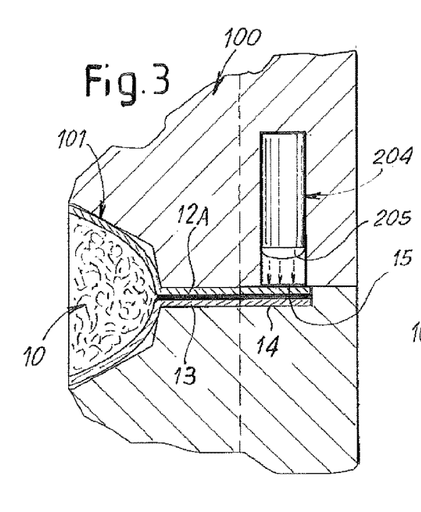
FIGS. 3, 4, 5 and 6 represent the enlargement of a part of FIG. 2, each illustrating a specific method for recognizing the pod, and in particular recognition methods which use optical, mechanical, magnetic and electrical elements.

FIG. 3 shows for example an optical recognition device, here indicated with 204, which includes optical elements such as a small video camera or, more generally, an optical sensor 205 aimed towards the usable area of the flap 14. Evidently, the recognition element 15 on the flap 14 is optically recognizable. Such element 15 includes, for example, an alphanumeric code (see FIG. 1).

Figure 7:
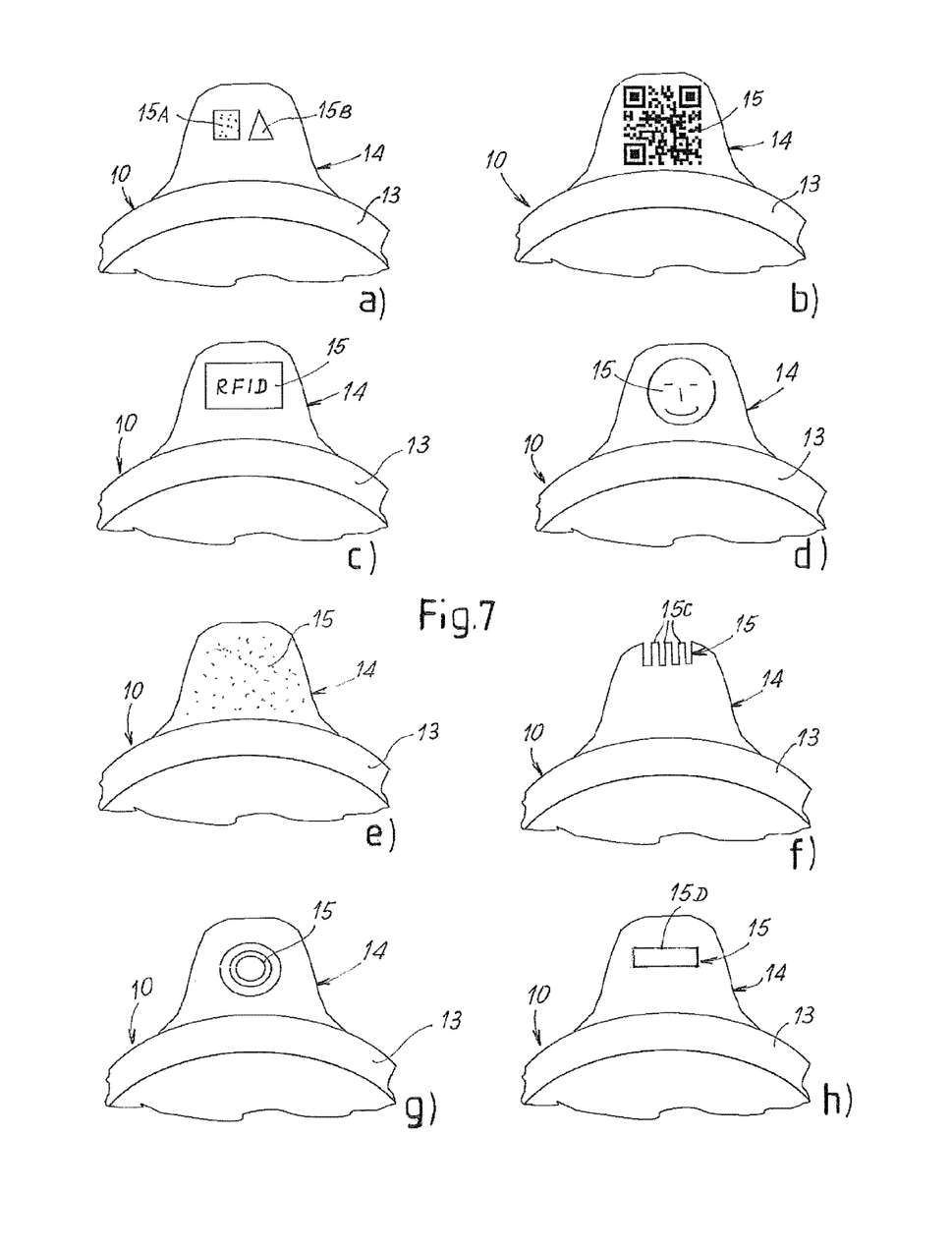
FIG. 7 shows eight examples of recognition elements applicable to the flap of the pod in a system according to this invention.

FIG. 7a shows two recognition elements 15A and 15B, consisting for example of two geometric shapes, of which one is colored. Therefore, the recognition device is capable of recognizing shapes, of distinguishing the number and also the colors. Shape, number and color can represent data which find a correspondent within the firmware of the dispenser 100, so that upon recognition and possibly following some of the user's actions, a certain action of the dispenser would result, such as for example the production of the beverage with certain process parameters (water at a certain temperature and in a certain quantity and pressure, etc.).

In addition, or alternatively, to the geometrical shapes and to the characters, the optical recognition device 204 may be capable of distinguishing abstract designs, symbols, etc. For example, FIG. 7d shows a recognition element 15C in the shape of a symbol.

The optical recognition device 204 may be capable of recognizing only colors. FIG. 7e shows a flap which is completely in color.

Also, the optical recognition device 204 may be capable of recognizing the shape of flap 14, for example, the recognition element 15 may be given by the shape of its outline. FIG. 7f shows a flap with an edge 15C which has a codified shape.

Furthermore, the optical recognition device 204 may be capable of recognizing standardized codes. For example, FIG. 7b shows a recognition element 15 in the shape of a "matrix code."

In addition, the optical recognition device 204 may be capable of recognizing a variation in thickness present on the flange or, even better, on the flap, such as for example a protuberance, or even a depression, a carving, a perforation, a groove, etc. (this is not specifically illustrated in the figures, but should be considered as included in this invention).

Evidently, in other embodiments, the optical recognition device 204 may be capable of recognizing a combination of the abovementioned elements.

Figure 4:
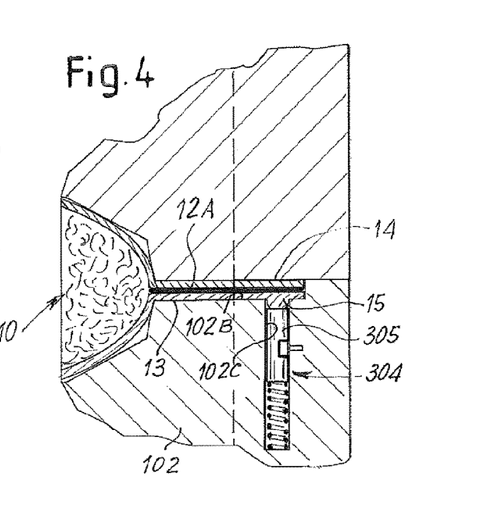

FIG. 4 shows an example of a mechanical recognition device, here indicated with 304.

In this case, the recognition element 15 on the pod will preferably have at least one variation in thickness with respect to the part of the filtering body on which it appears, and this variation can be detected mechanically, for example via a mechanical probe 305 fitted into the recognition device 304. For example, the recognition element 15 is a protuberance which develops from flap 14 and which can be inserted in a corresponding perforation 102C on the lower support 102B of the flap (FIG. 7g shows the flap with the protuberance in plan view) and within which the mechanical probe 305 is placed. The presence of the protuberance will be read as data by the recognition device, and possibly even the height of the protuberance measured by the mechanical probe 305 could be a piece of information that the device is capable of recognizing (there could be pods with protuberances of various heights and each height will correspond to one type of information or information set).

Figure 5:
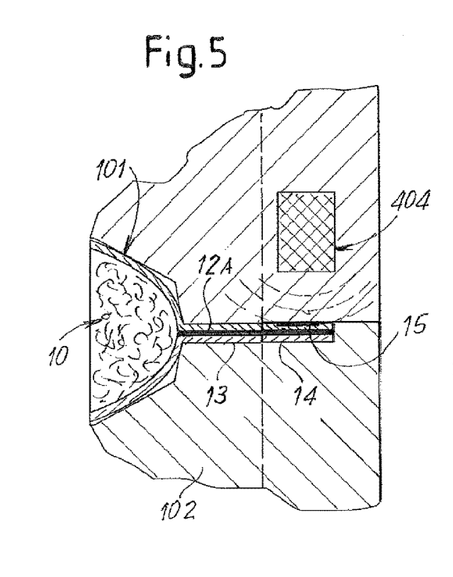

FIG. 5 shows an example of a magnetic recognition device, here indicated with 404, and the recognition element 15 is magnetically recognizable. For example, the device 404 is a RFID reader and the recognition element 15 is an RFID label (also sketched in FIG. 7c); such label can be placed on the surface or can be included inside the flap or the support attached to the pod which carries the label.

Figure 6:
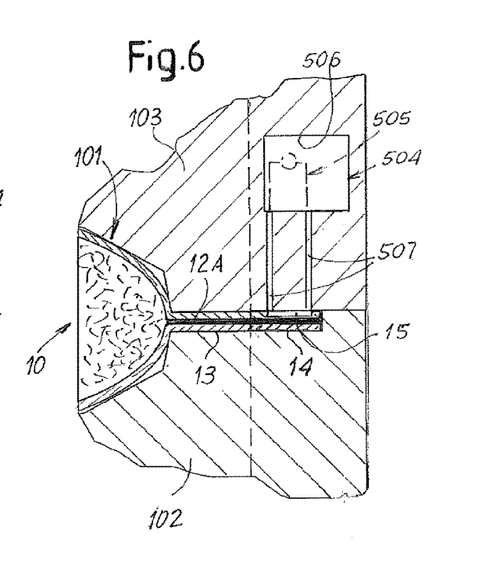

FIG. 6 shows an example of electrical recognition element, here indicated with 504, and includes an electrical circuit 505 associated to the control elements 506; the recognition element 15 includes in this case a conductive insert 15D (also seen in FIG. 7h) which is a bridge capable of creating an electrical contact between two electrical terminals of the circuit 507, closing it (in practice, the bridge 15D acts as a circuit breaker). The closing of the circuit corresponds to the recognition of the pod. In other embodiments, there may be more electrical circuit sections and more bridges or conductive inserts (bridges and/or conductive inserts could themselves form circuit sections or electrical circuits defined on the flap or on the flange, so as to create different options for recognition and hence different information sets. It must be remarked that the electrical recognition device could also include an electrical circuit fitted with a dip switch or a circuit breaker which may for example be opened by a nonconductive appendage on the flap, for example when the closing body 103 is closed on the infusion chamber with the pod inside. Also, the recognition element could act as insulator between two sections of the electrical circuit associated to the recognition device and which therefore interrupts the circuit.

It goes without saying that the object of this invention also includes a pod according to one or several of the embodiments described above and also a beverage dispenser according to one or several of the embodiments described above.

It is obvious from what was described above that the invention reaches the goals that were set for it. In fact, according to the invention, the beverage dispenser is able to recognize certain data associated to the pod and hence is capable of checking if the pod is "original" and therefore well-suited for the specific dispenser. This recognition also makes it possible to establish an association between the type of pod and the adjustable parameters of the dispenser in order to obtain the right beverage based on the type of substance contained and also on the user's preferences. The recognition of data on the pod also makes it possible to gather statistical information regarding the type of beverage consumed, the frequency of consumption, etc.

Please note how the position of the element (or recognition elements) on the flap makes it possible to reduce to a minimum or to completely eliminate the quantity of beverage that may reach the recognition element during the production of the beverage due to absorption of liquids by the sheets 11A of the filtering body and the flange 13. In fact, the flap lengthens the path of the possible absorbed liquids and hence reduces the risk of such liquids reaching the area occupied by the recognition element and the recognition device, thus protecting them. In addition, in the case in which the flap or the support of the recognition element on the flap are made of non-absorbent material, such risk of liquid absorption is completely averted.

Of course, what is presented here are only possible non-restrictive embodiments of the invention, which may vary in shape and design without departing from the concept which is at the basis of the invention. The presence of reference numbers in the claims section attached has as sole purpose to facilitate reading in the light of the description above and of the drawings annexed and does not in any way limit the scope of protection. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A system for production of a beverage, the system comprising:
a beverage dispenser comprising a recognition device; and a pod inserted into the beverage dispenser for dispensing an extraction liquid of the beverage, wherein the pod comprises a filtering body which defines a space containing a substance from which the beverage is obtained, wherein an exterior of the filtering body has a flange, wherein the pod further comprises a recognition element associated to the filtering body, wherein the recognition device of the beverage dispenser is configured to recognize the recognition element for recognition of the pod, wherein the recognition element of the pod includes at least one conductive insert and is placed on a flap departing from the flange, and wherein the recognition device of the beverage dispenser is electrical and comprises an electrical circuit, and wherein the electrical circuit comprises two electrical terminals and is configured to electrically contact the at least one conductive insert of the recognition element of the pod for recognition of the pod based on the electrical contact through the two electrical terminals of the electrical circuit of the beverage dispenser with the at least one conductive insert of the recognition element of the pod.

2. The system according to claim 1, wherein the recognition element is placed on the flange.

3. The system according to claim 1, wherein the recognition element is placed on a support fastened to the flap.

4. The system according to claim 1, wherein the recognition device is mechanical.

5. The system according to claim 1, wherein the recognition device comprises a magnetic recognition and the recognition element is magnetically recognizable.

6. The system according to claim 1, wherein the recognition device comprises a combination of two or more recognition devices which are at least one of optical, mechanical, magnetic and electrical.

7. The system according to claim 1, wherein the recognition element comprises a bridge configured to directly electrically contact two sections of the electrical circuit.

8. The system according to claim 2, wherein the recognition device comprises an optical recognition element and the recognition element is configured to be optically recognizable.

9. The system according to claim 4, wherein the recognition element has a variation in thickness with respect to the filtering body on which it is placed, and wherein the variation in thickness is detectable by the recognition device.

10. The system according to claim 7, wherein the bridge is-a includes the at least one conductive insert configured to close the electrical circuit, and wherein closing of the electrical circuit causes the recognition of the pod.

11. The system according to claim 7, wherein the electrical circuit comprises a plurality of sections, and wherein the directly electrically contact of the two sections of the plurality of sections by the bridge provides the recognition of the pod.

12. The system according to claim 8, wherein the optical recognition element is configured to least one of recognize and interpret at least one of a shape, a size, a depth, a thickness, and a color of the recognition element.

13. The system according to claim 8, wherein the optical recognition element is configured to least one of recognize and interpret at least one of texts, codes, and symbols.

14. A beverage dispenser for use with a pod to be inserted into the beverage dispenser for dispensing of a beverage, the beverage dispenser comprising:
a support configured to support the pod which inserted into the beverage dispenser for dispensing an extraction liquid of the beverage; and
a recognition device,
wherein the pod comprises a filtering body which defines a space containing a substance from which the beverage is obtained, wherein an exterior of the filtering body has a flange, wherein the pod further comprises a recognition element associated to the filtering body, wherein the recognition device of the beverage dispenser is configured to recognize the recognition element for recognition of the pod, wherein the recognition element of the pod includes at least one conductive insert and is placed on a flap departing from the flange,
wherein the recognition device of the beverage dispenser is configured to recognize the pod,
wherein the recognition device is electrical and comprises an electrical circuit, and
wherein the electrical circuit comprises two electrical terminals and is configured to electrically contact the at least one conductive insert of the recognition element of the pod for recognition of the pod based on the electrical contact through the two electrical terminals of the electrical circuit of the recognition device of the beverage dispenser with the at least one conductive insert of the recognition element of the pod.

* * * * *